United States Patent [19]

Ishii

[11] Patent Number: 5,626,886
[45] Date of Patent: May 6, 1997

[54] TRANSFER MOLDING MACHINE FOR ENCAPSULATION OF SEMICONDUCTOR DEVICES

[75] Inventor: Masaaki Ishii, Fukuoka, Japan

[73] Assignee: Dai-Ichi Seiko Co., Ltd., Japan

[21] Appl. No.: 391,024

[22] Filed: Feb. 21, 1995

[51] Int. Cl.⁶ ................................ B29C 45/14
[52] U.S. Cl. ............... 425/116; 100/258 A; 100/295; 264/272.17; 425/121; 425/190; 425/406; 425/593
[58] Field of Search ................ 425/116, 121, 425/190, 193, 195, 406, 544, 593, 451.6; 100/211, 258 R, 258 A, 295; 264/272.17

[56] References Cited

U.S. PATENT DOCUMENTS

| | | | |
|---|---|---|---|
| 4,044,984 | 8/1977 | Shimizu et al. | 425/127 |
| 4,753,160 | 6/1988 | Baird et al. | 425/406 |
| 5,059,105 | 10/1991 | Baird | 425/121 |
| 5,059,379 | 10/1991 | Tsutsumi et al. | 264/272.17 |
| 5,118,271 | 6/1992 | Baird et al. | 425/116 |
| 5,259,752 | 11/1993 | Scolamiero et al. | 425/406 |
| 5,344,296 | 9/1994 | Laninga | 425/117 |
| 5,405,255 | 4/1995 | Neu | 264/272.17 |
| 5,409,362 | 4/1995 | Neu | 264/272.17 |

OTHER PUBLICATIONS

English Abstract of Japanese Utility Model No. JP-P-3-6410, and copy of Japanese Utility Model, Feb., 1991.

English Abstract of Japanese Patent No. JP-B-61-3648, and copy of Japanese Patent, Feb., 1986.

*Primary Examiner*—James P. Mackey
*Attorney, Agent, or Firm*—Venable, Baetjer, Howard & Civiletti, LLP

[57] ABSTRACT

A transfer molding machine for encapsulation of semiconductor devices with a resin comprises a clamping mechanism with an electrically actuated toggle mechanism, a pair of upper and lower sections of a transfer mold, and at least one compensation unit including upper and lower plates and a plurality of elastic members held between said upper and lower plates. The compensation unit is arranged either between the upper stationary platen and the upper mold section or between the moving platen and the lower mold section to compensate the dimensional errors in the mold sections and clamping mechanism.

8 Claims, 4 Drawing Sheets

5,626,886

TRANSFER MOLDING MACHINE FOR ENCAPSULATION OF SEMICONDUCTOR DEVICES

BACKGROUND OF THE INVENTION

1. Field of the Invention

The present invention relates to a transfer molding machine for encapsulation of semiconductor devices with a resin compound and, more particularly, to an electrically-driven transfer molding machine for encapsulation of semiconductor devices with a thermosetting resin without causing resin flash on a lead frame having semiconductor devices bonded thereto.

2. Description of the Prior Art

A transfer molding machine used for encapsulation of semiconductor devices with a thermosetting resin, generally comprises a clamping device, a transfer mold arranged therein, a resin transfer mechanism for injecting a resin compound from a pot into cavities of the mold, and an ejector mechanism for ejecting the molded products from the cavities. The clamping device includes a stationary base platen; four tie rods fixed at one end thereof to the base platen; a stationary upper platen mounted on the opposite ends of the tie rods, to which an upper mold section of the transfer mold is directly bolted; and a moving lower platen movably mounted on the tie rods, to which a lower mold section of the transfer mold is directly bolted. The clamping device is generally provided with a hydraulic cylinder connected directly or through a toggle mechanism to the moving platen to exert an opening and closing force and hold the mold closed during a curing time.

In operation, a thermosetting resin compound is loaded into a pot of the mold and then one or more lead frames each having semiconductor devices or chips previously bonded thereto are loaded into cavities of the lower mold section. The moving lower platen is actuated by the hydraulic clamping mechanism to close the mold. Then, the thermosetting resin compound in the pot is transferred to the cavities of the closed mold through gates whereby the semiconductor devices are enclosed in the resin. After curing, the mold is opened and the molded pieces are ejected from the cavities of the mold by the ejector mechanism.

However, the hydraulic clamping mechanism has a serious disadvantage that an actuating oil often leaks from the hydraulic cylinder and exerts bad influences on the quality of the semiconductor devices. Thus, there is an increasing demand for development of a clean transfer molding machine for encapsulation of semiconductor devices, free from the leakage of the actuating oil.

To meet this demand, inventors have tried to use an electric motor to exert the opening and closing force and hold the mold closed during curing time. In this case, it is required to reduce a load of an electric motor during a cooling time for final curing of the thermosetting resin. This can be done by a combination of the electric motor with a toggle mechanism, i.e., by an electrically-actuated toggle mechanism.

However, it has now been found that the clamping device with the electrically-actuated toggle mechanism causes resin flash on the lead frame. As is well-known, the toggle mechanism is limited in the maximum stroke for applying the opening and closing force to the moving platen by the size of its links. In case of the hydraulic clamping mechanism, the hydraulic cylinder leaves a sufficient margin for upper stroke of the links whereby the difference in precision of the links is compensated completely.

Different from the hydraulic clamping mechanism, the electrically-actuated toggle mechanism has no margin for the upper stroke of the links, thus making it impossible to compensate for the difference in precision of the links. For this reason, it is unable to hold the moving platen of the clamping mechanism in parallel to the upper stationary platen when the mold is closed. Both the upper and lower mold sections are directly bolted to the stationary top platen and moving platen, thus making it impossible to hold mating surfaces of the mold sections parallel with one another. This provides a slight gap between the mold sections of the closed mold and the lead frame loaded therein so that the resin can flash on the lead frames and exerts bad influences on the appearance and quality of the products. In addition, the flash must be removed from the lead frame before the products are put on the market, thus making it difficult to make all the transfer molding operations automatic.

Further, even with careful design of the mold, resin flash occurs on the lead frame when the mold becomes worn or when close tolerance on lead frames is not maintained. In the hydraulic-actuated transfer molding machine, some techniques have been proposed, for example, in Japanese patent JP-B- 61-3648 and Japanese Utility model JP-B- 3-6410 to prevent the resin flash.

Japanese patent JP-B- 61-3648 discloses a transfer molding machine including a transfer mold with floating cavity blocks. The use of the floating cavity block mold fulfills its function at the initial stage of usage, but its function would be lost gradually as the resin would flash in gaps formed between floating cavity blocks and mold chases or retainer plates.

Japanese Utility model JP-B- 3-6410 discloses a transfer molding machine including a mold with compressible cavity blocks. However, the compressible cavity blocks make the mold complicated, resulting in considerably increase in manufacturing cost of the transfer mold.

SUMMARY OF THE INVENTION

It is therefore an object of the present invention to provide a transfer molding machine for encapsulation of semiconductor devices, which is simple in construction, free from oil leakage, and which ensures close contact of the mating surfaces of upper and lower sections of a mold to prevent the mold from resin flash.

According to the present invention, the above and other objects are achieved by providing a transfer molding machine for encapsulation of semiconductor devices with a resin, comprising a clamping mechanism with an electrically actuated toggle mechanism, a pair of upper and lower sections of a transfer mold, and at least one compensation unit including upper and lower plates and a plurality of elastic members held between said upper and lower plates, said at least one compensation unit being arranged either between the upper stationary platen and the upper mold section or between the moving platen and the lower mold section.

In a preferred embodiment, the compensation unit further includes a holding plate arranged between said upper and lower plates and provided with a plurality of through-holes for holding said elastic members respectively.

In another preferred embodiment, the compensation unit is arranged between the upper stationary platen of the clamping mechanism and the upper mold section of the transfer mold and composed of upper and lower plates, a holding plate arranged between them and having a plurality of through-holes, and a plurality of elastic members in the form of a short round body, said elastic member being respectively held in said through-hole of the holding plate.

In still another preferred embodiment, the molding machine includes two compensation units of which one is arranged between the upper stationary platen of the clamping mechanism and the upper mold section of the transfer mold, the other being between the moving platen of the clamping mechanism and the lower mold section of the transfer mold. In this case, it is preferred to use compensation units each including upper and lower plates, a holding plate arranged between them and having a plurality of through-holes, and a plurality of elastic members made into a short round body and respectively held in the through-holes of the holding plate.

The provision of the compensation unit enables to make the platens parallel to each other as the difference in size of links is compensated by elastic deformation of the compensation unit, thus making it possible to apply a uniform load to every parts of mating mold surfaces of the mold, which in turn makes it possible to prevent flashing of the resin on the lead frame.

Further scope of applicability of the present invention will become apparent from the detailed description given hereinafter with reference to the accompanying drawings. However, it should be understood that the detailed description and specific examples, while indicating preferred embodiment of the invention, are given by way of illustration only, since various changes and modifications within the spirit and scope of the invention will become apparent to those skilled in the art from this detailed description.

DETAILED DESCRIPTION OF THE PREFERRED EMBODIMENT

Figure 2:
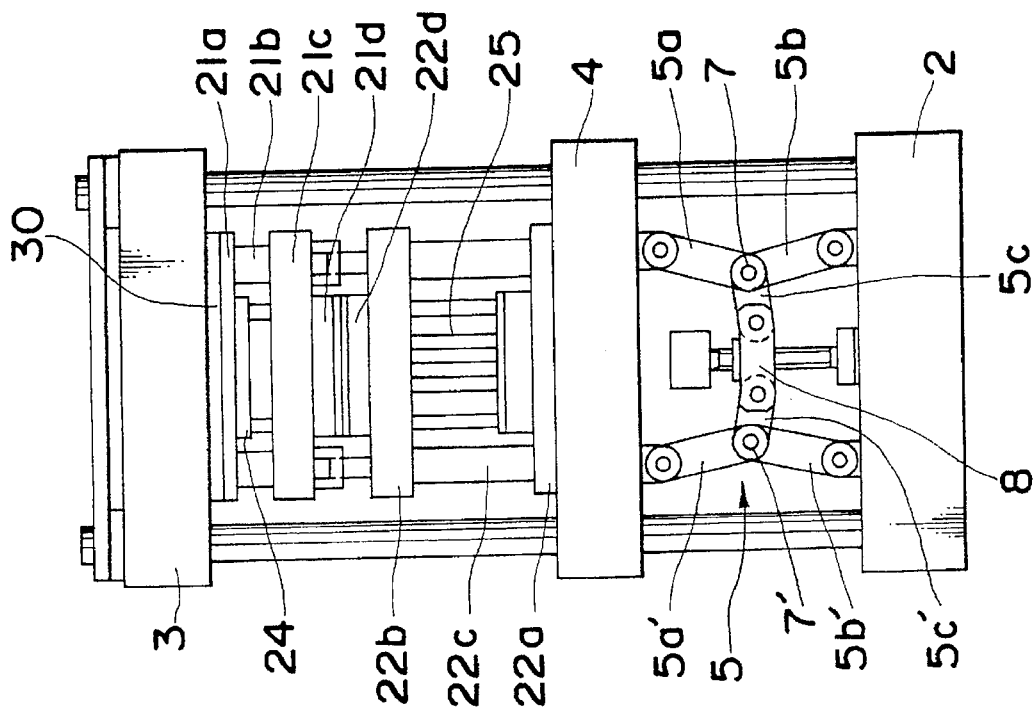
FIG. 2 is a side view of a transfer molding machine of FIG. 1.
Figure 1:
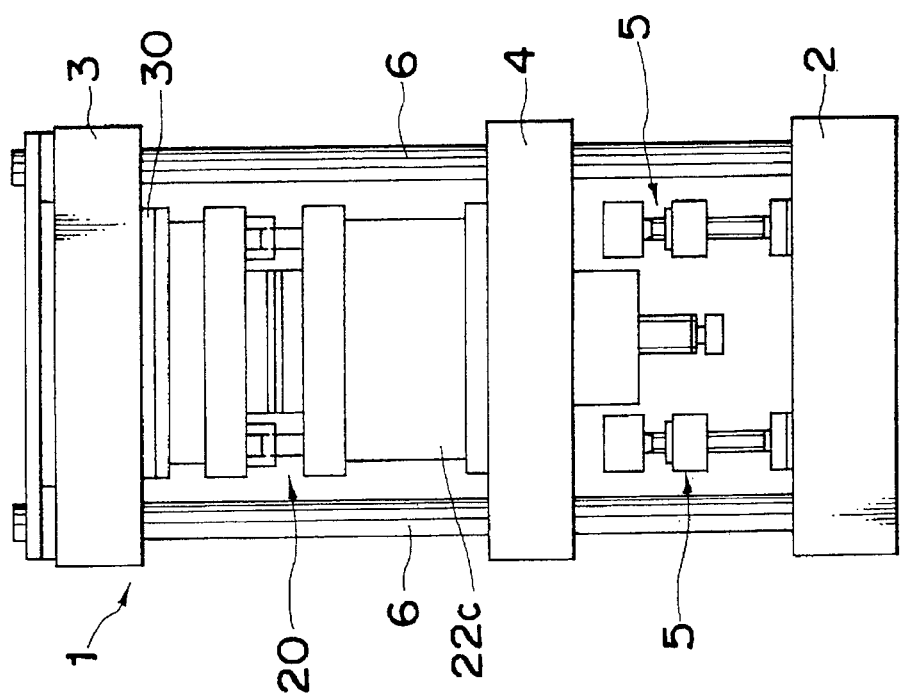
FIG. 1 is a schematic front view of a transfer molding machine for encapsulation of semiconductor devices, with a transfer mold being closed.
Figure 3:
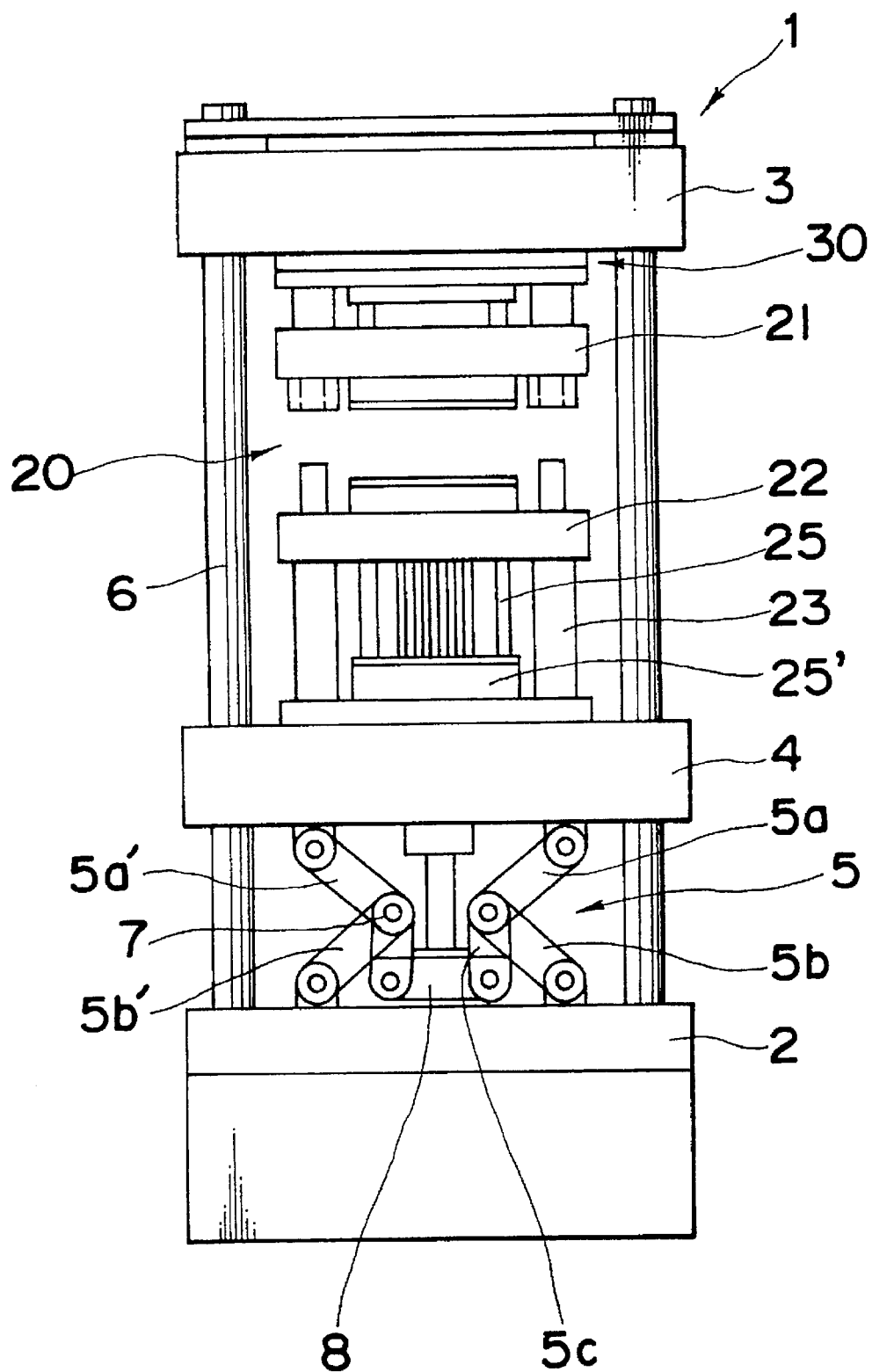
FIG. 3 is a side view of the transfer molding machine of FIG. 1, with a transfer mold being opened.

Referring to FIGS. 1 to 3, there is shown a transfer molding machine for encapsulation of semiconductor devices according to the present invention, comprising a double toggle clamping device (1), a transfer mold (20) arranged in the clamping device (1) and an error compensation unit (30).

The clamping device (1) comprises a stationary base platen (2) with four tie rods (6) passing through a moving platen (4) and then through a stationary upper platen (3), and an electrically-actuated double toggle mechanism (5) mounted on the base platen (2).

Figure 4:
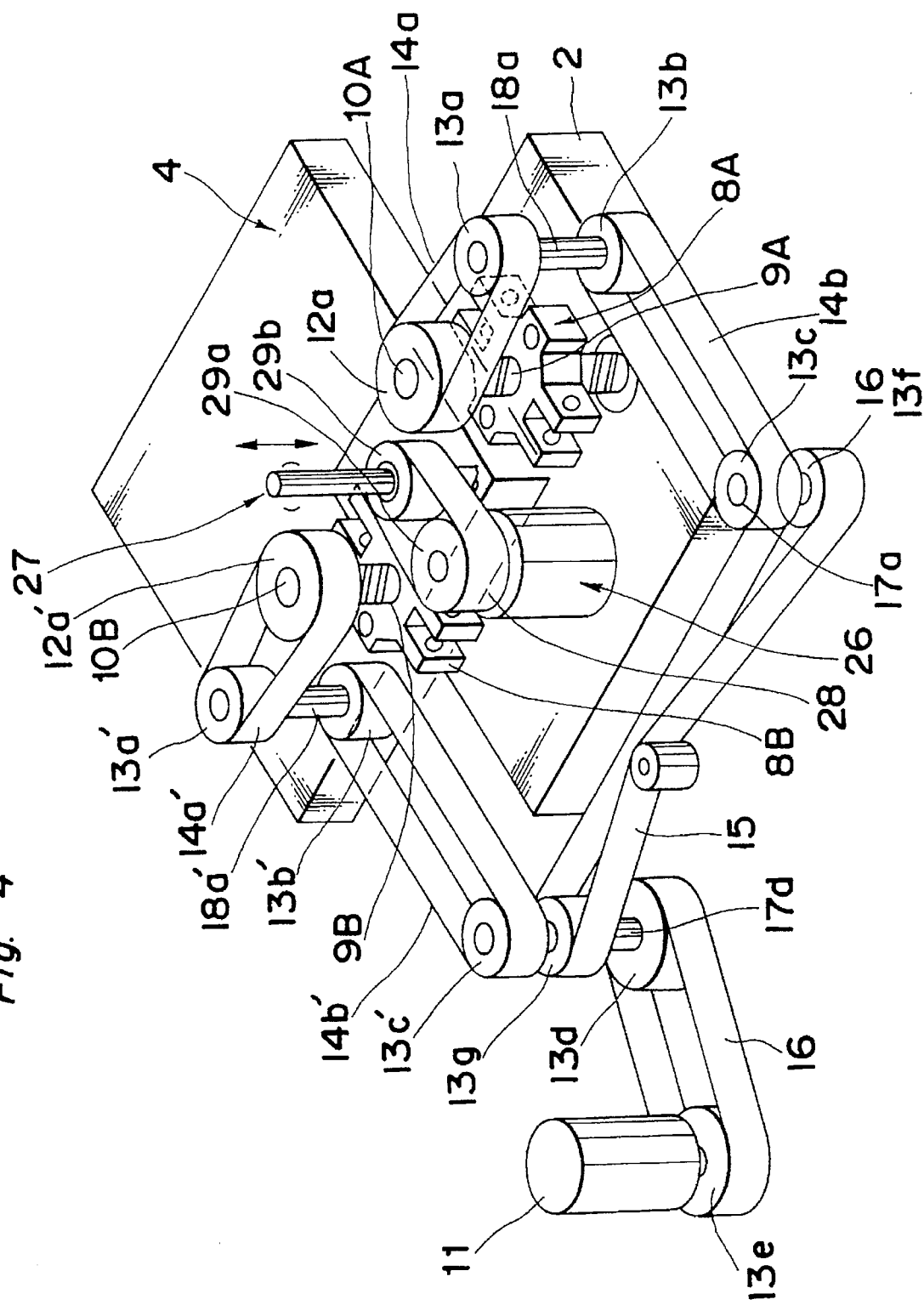
FIG. 4 is a perspective view of a toggle actuating unit used in the transfer molding machine of FIG. 1.

The toggle mechanism (5) is composed of two pairs of link mechanisms actuated by an electric motor generally indicated by numeral (11) in FIG. 4, each link mechanism (5) consisting of upper and lower links (5a, 5b; 5a', 5b') joined together in the end-to-end relationship by a pivot (7, 7'). The upper links (5a, 5a') are pivotally connected to the moving platen (4) while the lower links (5b, 5b') are pivotally connected to the base platen (2). Pivotally connected to the upper and lower links in pair is a crosshead link (5c, 5c') pivotally connected to a crosshead (8A, 8B).

As shown in FIG. 4, each crosshead (8A, 8B) is provided with a threaded center hole (9A, 9B) and engaged with a threaded actuating shaft (10A, 10B) rotatably mounted on the base platen (2). Each actuating shaft (10A, 10B) is provided at its free end with a belt pulley (12a, 12a') around which a belt (14a, 14b) passes. These actuating shafts (10A, 10B) are driven synchronously by the electric motor (11) through a transmission mechanism including pulleys (13a–13g, 13a'–13c') and belts (14a–14b, 14a'14b', 15, 16).

In operation, the actuating shafts (10A, 10B) rotate clockwise or counterclockwise to extend or contract the toggle mechanism, so that the moving platen (4) is moved up and down to exert the opening and closing force and to hold the mold closed during the curing time.

The transfer mold (20) is of a multiple-cavity multiple plunger-type and comprises an upper and lower mold sections (21, 22) having the same structure as that of the multiple-cavity multiple plunger-type transfer mold of the prior art. The lower mold section (22) is mounted on the moving platen (4) by means of spacer blocks (23) while the upper mold section (21) is fixed to the upper stationary platen (3) along with the compensation unit (30) by bolts (38) passing therethrough.

As best shown in FIG. 2, the upper mold section (21) includes an upper mold attachment plate (21a), an upper mold plate (21c) spaced by spacer plates (21b), and upper mold cavity blocks (21d) fixed to the upper mold plate (21c). Arranged between the upper mold section (21) and compensation unit (30) is an upper ejector plate (24) with runner ejector pins for ejecting the molded resin in the runners. The lower mold section (22) includes a lower mold attachment plate (22a), a lower mold plate (22b) spaced by spacer plates (22c) and lower mold cavity blocks (22d) mounted on the mold plate (22b). The lower mold section (22) further includes a transfer mechanism (25–29) for injecting a resin compound into cavities of the closed mold (20), and a lower ejector mechanism (not shown) including a plurality of ejector pins (not shown) for ejecting encapsulated articles from the cavities of the mold (20). The ejector mechanism is arranged between the lower mold section (22) and moving platen (4).

The transfer mechanism includes a plurality of plungers (25) mounted on a plunger plate (25'), pots (not shown) passing through the lower mold section (22), and an electrically accutated driving mechanism (26–29) including an an electric motor (26). The electric motor (26) is mounted, as shown in FIG. 4, on the moving platen (4) and connected to an actuating shaft (27) through a belt (28) and pulleys (29a, 29b). The actuating shaft (27) is provided with a thread round it and engaged with a threaded pulley (29b).

Figure 5:
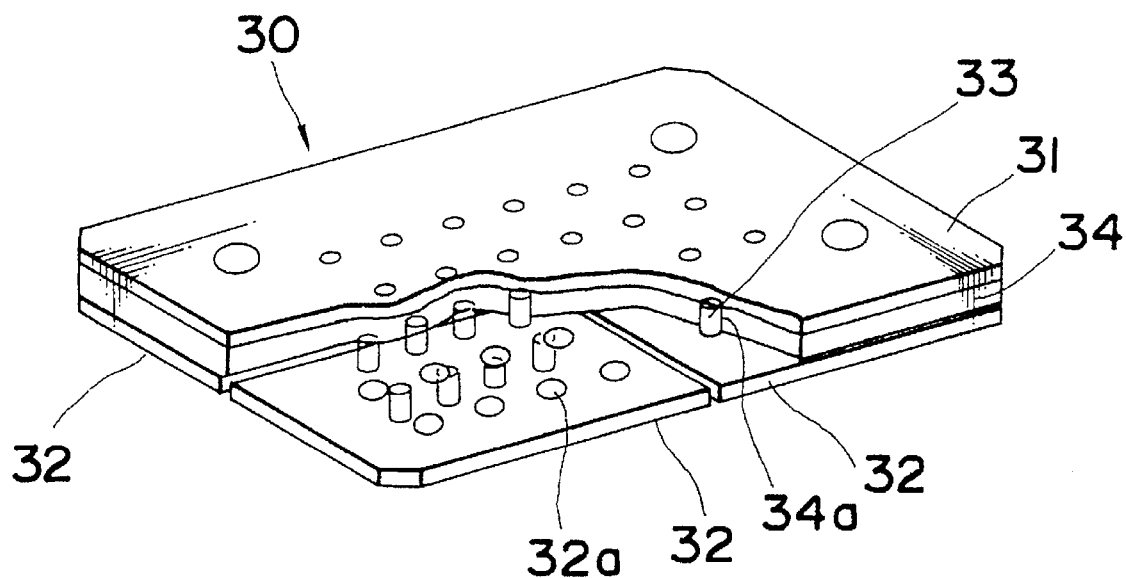
FIG. 5 is a perspective view of a mold-mounting unit used in the transfer molding machine of FIG. 1.
Figure 6:
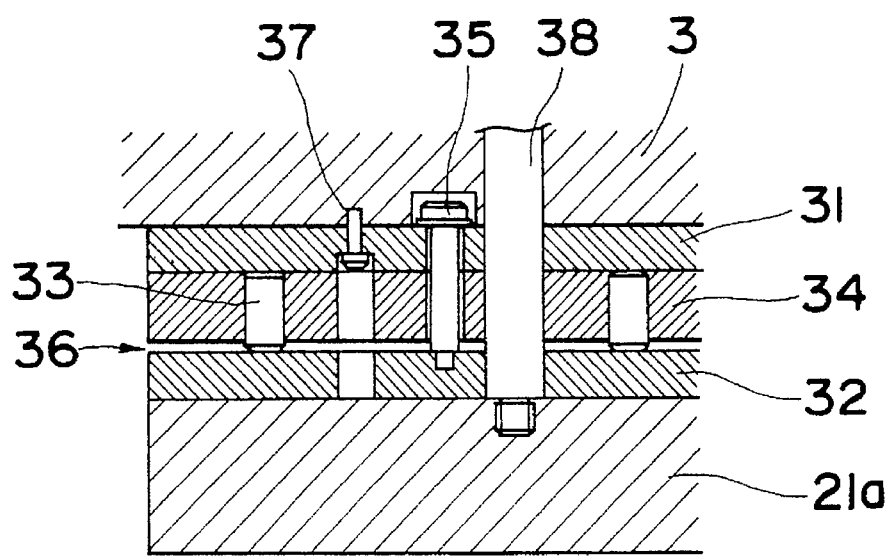
FIG. 6 is an enlarged section view illustrating an essential part of the transfer molding machine of FIG. 1.

As best shown in FIGS. 5 and 6, the compensation unit (30) comprises upper and lower plates (31, 32), a perforated holding plate (34) arranged between them, and a plurality of elastic members (33) loosely held in the holding plate (34).

As shown in FIG. 6, the lower plate (32) is divided into four sections (32') having plural through-holes (32a) and joined with-the upper plate (31) and the holding plate (34) by bolts (35). The unit is fixed to the upper stationary platen (3) by bolts (37).

The elastic members (33) are made of an elastic material in the form of a short round body and so designed as to have a length slightly longer than the thickness of the holding member (34) to form a gap (36) between the holding plate (34) and upper or lower plate (31, 32). In this embodiment, the elastic members are formed into a short round body but may be formed into a coil, a hollow cylindrical member or the like. Preferred materials for the elastic members are die steels such as SKD 1, SKD 2 and SKD 3, specified in JIS.

Using the above transfer molding machine, semiconductor chips are encapsulated with a thermosetting resin in the following manner: Firstly, the thermosetting resin and lead frames having semiconductor chips mounted thereon are loaded in the lower mold section (22) and then the moving platen (2) is moved upward by the electrically-actuated toggle mechanism (5) to close the mold. During extending motion of the toggle mechanism (5), the lower mold section (22) is moved toward the upper mold section (21) by a certain closing force of the clamping mechanism. After the lower mold section (22) are brought into contact with the upper mold section (21), the closing force is transmitted to the elastic members (33) of the compensation unit (30) through the upper and lower mold sections (21, 22), causing compressive deformation of the elastic members (33) according to the force applied thereto. If there is any dimensional errors of the mold sections and clamping mechanism, the amount of the compressive deformation of the elastic members (33) varies with the force applied to each elastic member, thereby compensating the dimensional errors to hold the lower mold section (21) parallel to the upper mold section (22). Thus, a uniform closing force is applied to the every parts of the mating surfaces of the upper and lower mold sections (21, 22). This provides uniform contact of all the mating surfaces of the mold sections with each other.

Then, the thermosetting resin softened by heat and pressure is injected into cavities of the closed mold by the transfer mechanism (25–29) to encapsulate the semiconductor chips in the resin. During transfer molding, all the mating surfaces of the mold sections are held in parallel with each other by the compensation unit (30) to provide uniform contact, thus making it possible to encapsulate the semiconductor chips with the resin without flashing on the lead frame. After curing by cooling, the moving platen (4) is moved downward to open the mold (20) and then the ejector mechanism (24) is actuated by the electric motor (11) to eject encapsulated semiconductor chips out of the cavities of the mold (20).

As will be understood from the above, the present invention makes it possible to produce semiconductor devices with no resin flashing on the lead frame. Further, there is no need to use a transfer mold with a mechanism for prevention of resin flash, thus making it possible to reduce the manufacturing cost of the transfer mold, which in turn makes it possible to achieve reduction of the semiconductor devices produced.

Further, if the clamping force should be changed to accommodate it to a new transfer mold, this can be done easily by replacing the compensation unit with new one having a desired resistance to compressive deformation. In this case, the compensation unit may be removed along with the upper mold section.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A transfer molding machine for encapsulation of semiconductor devices with a resin, comprising:

a clamping mechanism including a stationary base platen provided with tie rods, a moving platen movably mounted on said tie rods, a stationary upper platen fixed to said tie rods, and an electrically actuated toggle mechanism are ranged between said base platen and said moving platen to force the moving platen to move;

a transfer mold including a pair of upper and lower mold sections respectively mounted on said upper stationary platen and said moving platen; and at least one compensation unit arranged either between said upper stationary platen and said upper mold section or between said moving platen and said lower mold section, each said compensation unit including upper and lower plates, a holding plate arranged between said upper and lower plates and provided with a plurality of through-holes, and a plurality of elastic members each being held in said through-holes of said holding plate, said elastic members having a length slightly greater than the thickness of said holding plate so as to provide a gap between said holding plate and one of said upper and lower plate.

2. The transfer molding machine according to claim 1 wherein said compensation unit is arranged between said upper stationary platen and the upper mold section of the transfer mold.

3. The transfer molding machine according to claim 1, wherein the lower plate of said compensation unit is divided into four sections each being joined with said upper plate and said holding plate by a bolt.

4. The transfer molding machine according to claim 1, wherein said lower mold section includes a lower mold attachment plate, a lower mold plate spaced from said lower mold attachment plate by spacer plates, and lower mold cavity blocks mounted on said lower mold plate, said compensation unit being arranged between said lower mold attachment plate and said moving platen.

5. The transfer molding machine according to claim 1, wherein said toggle mechanism is composed of two pairs of link mechanisms actuated by an electric motor, each link mechanism consisting of upper and lower links joined together in end-to-end relationship and pivotally connected to a cross head by means of cross head links, each of the upper links being pivotally connected to the moving platen, each of the lower links being pivotally connected to the base platen.

6. The transfer molding machine according to claim 5, wherein said cross head is provided with a threaded center hole and engaged with a threaded actuating shaft rotatably mounted on the base platen, wherein said actuating shaft is synchronously driven by an electric motor through a transmission mechanism.

7. The transfer molding machine according to claim 1, wherein said elastic members are made of die steels in the form of a cylindrical member.

8. The transfer molding machine according to claim 1, wherein said molding machine includes two compensation units of which one is arranged between the upper stationary platen and the upper mold section, and the other is arranged between the moving platen and the lower mold section.

* * * * *